Patented July 5, 1932

1,865,940

UNITED STATES PATENT OFFICE

HANS MEERWEIN AND HEINRICH MORSCHEL, OF KONIGSBERG, GERMANY, ASSIGNORS TO THE FIRM SCHERING-KAHLBAUM A. G., OF BERLIN, GERMANY

PRODUCTION OF ACETONE

No Drawing. Application filed April 5, 1929, Serial No. 352,909, and in Germany April 7, 1928.

Our invention refers to the production of acetone from acetylene and has for one of its objects to provide means whereby acetone can be produced from acetylene in a simpler and more efficient manner than was hitherto possible.

As is well known to those skilled in the art, when acetylene is conducted together with steam in excess over heated contact substances, it will be converted in a single operation into acetone. The reaction, during which acetaldehyde and acetic acid are formed as intermediate products, may be represented by the following equation:

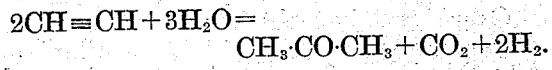
$$2CH\equiv CH + 3H_2O = CH_3 \cdot CO \cdot CH_3 + CO_2 + 2H_2.$$

It has already been suggested to carry through this catalytic reaction with the aid of contact masses, such as iron oxide or compounds containing same, thorium oxide or double salts of thorium with salts of alkali forming metals or earth alkali metals, for instance

$$Th(CO_3)_5K_6 + 10H_2O$$

etc. If iron oxide is used, the yield of acetone is said to be 25–50%, if potassium thorium carbonate is used, 40% of the acetylene used. It has however been found that an iron oxide catalyst is soon spent and must therefore be regenerated from time to time by passing air over it. In view of the comparatively low yields, these prior processes are not commercial.

We have now found that a perfect direct conversion of a mixture of acetylene and steam into acetone is obtained with high yield, if mixtures of oxides of metals of the second, third, fourth or sixth group of the periodic system are used as contact substances. Instead of the oxides also the hydroxides or carbonates or such salts of these metals can be used, which, for instance like the formiates, acetates or oxalates, are converted into the oxides by heating.

We have found that a very efficient catalyst consists of stannic oxide and cerium oxide, or of stannic oxide and an oxide of zirconium, chromium or zinc, or of mixtures of the oxides of zirconium, cerium, thorium or titanium with each other or with oxides of chromium, zinc or an alkaline-earth metal.

Apparently it is immaterial whether the oxides in the mixture are compounds of elements having chemical affinity or not. We may combine with the same success two mainly basic oxides, such as for instance cerium oxide and zirconium oxide, or a basic oxide and an acid oxide, for instance titanium oxide with calcium oxide.

We have further found that frequently mixtures of more than two oxides, in which an oxide of tin, cerium, zirconium, thorium, or titanium is one of the constituents, are superior in their effect to mixtures consisting only of two oxides. Thus a mixture of stannic oxide with cerium oxide and zirconium oxide gives a higher yield of acetone than mixtures containing stannic oxide and cerium oxide, stannic oxide and zirconium oxide or cerium oxide and zirconium oxide.

By suitably mixing oxides of the kind aforesaid, the disturbing intermediate reactions of certain oxides, for instance the oxidizing action of cerium oxides or the decomposing action of zirconium oxides, can be paralyzed for the greater part.

The mixture of catalysts are obtained either by directly mixing the single catalysts or by precipitating the metal salts, more especially the nitrates, chlorides or acetates together with ammonia, ammonium carbonate or sodium carbonate followed by washing and drying.

In order to increase the surface it may prove useful to precipitate the contact substances on inert carrier substances, such as pumice stone, fragments of ceramic material and the like or to mix them with such materials.

The ratio of acetylene to steam may vary within wide limits, but we have found it preferable to use not less than 5 volumes steam per 1 volume acetylene.

The mixture of acetone and steam which escapes from the apparatus is preferably cooled down only so far that substantially only the steam is condensed whereupon the acetone is condensed in a second cooler. The condensed water is introduced anew into the reaction chamber together with acetylene, whereby small quantities of acetic acid, which may have been formed as a by-product, are also converted into acetone.

Example 1

160 grs. ceri ammonium nitrate are dissolved in water and the solution is precipitated with ammonia. After filtering by suction and washing, the precipitate is dissolved in a watery solution of 160 grs. stannous chloride. 300 grs. pumice stone are added and the solution is then precipitated with ammonia and filtered by suction. Over the catalyst, which has previously been washed and dried, 227 ltrs. acetylene and 2370 grs. steam are conducted within 23 hours at a temperature of 460–490° C. After the condensates have been treated as usual, there are obtained 229 grs. acetone=77,9% of the calculated quantity and 3,6 grs. acetic acid=0.6% of the calculated quantity. The waste gases (314 ltrs.) were composed of 30,6% $CO_2$, 0,0% CO, 10,8% CH≡CH, 3,3% $CH_4$ and 55,4% $H_2$. This corresponds to a recovered quantity of acetylene of 35 ltrs.=15% of the acetylene introduced into the reaction chamber.

Example 2

135 grs. tin tetrachloride and 125 grs. thorium-nitrate are dissolved in water, 225 grs. pumice stone are added and the solution is precipitated with ammonia. After filtering by suction and washing and drying the catalyst thus obtained, 42 ltrs. acetylene and 3300 grs. steam are conducted over it within 23 hours at a temperature of 490° C. The condensate yields 158 grs. acetone=50,3% and 5,4 grs. acetic acid=0,9% of the calculated quantity. The waste gases (313 ltrs.) were composed of 24,1% $CO_2$, 0,0% CO, 35,2% acetylene, 3,2% $CH_4$ and 37,5% $H_2$. This corresponds to a recovery of acetylene amounting to 110 ltrs.=45,5% of the acetylene first used.

Example 3

A mixture of 125 grs. tin tetrachloride hydrate and 100 grs. crystallized calcium nitrate is dissolved in water mixed with 230 grs. pumice stone, precipitated with ammonium carbonate and the precipitate filtered by suction, rinsed and dried. Over the catalyst thus obtained are conducted within 16 hours and at a temperature of 500–525° C. 155,5 ltrs. acetylene and 1850 grs. steam. There are obtained 108,4 grs. acetone=53,9% and 2,4 grs. acetic acid=0,6% of the calculated quantity. The waste gases (229 ltrs.) were composed of 24,7% $CO_2$, 0,0% CO, 27,9% acetylene, 3% $CH_4$ and 44,4% $H_2$. This corresponds to a recovery of acetylene of 63,9 ltrs.=41,1% of the acetylene first used.

Example 4

210 grs. tin tetrachloride hydrate, 90 grs. zirconium nitrate and 60 grs. powdered pumice stone are precipitated with ammonia, the precipitate is filtered by suction, formed by pressure into a flat slab and dried. The hard mass thus obtained is broken to pieces. Over the catalyst thus obtained is conducted within 11½ hours at 525° C. a mixture of 153,6 grs. acetylene and 1050 grs. steam. There are obtained 115 grs. acetone=66,8% and 6,6 grs. acetic acid=1,9% of the calculated quantity. No acetaldehyde was found. 11% of the acetylene remained unchanged.

Example 5

Over a contact mass obtained in the manner above described from 150 grs. zirconium nitrate, 230 grs. ceri ammonium nitrate and 60 grs. powdered pumice stone are conducted within 14 hours and at 395° C. 176 grs. acetylene and 1200 grs. steam. There resulted 152,2 grs. acetone=77,4% and 0,9 grs. acetic acid, while about 16% of the acetylene remained unchanged.

Example 6

Over a catalyst obtained in the manner above described from 150 grs. titanium tetrachloride, 150 grs. cerium chloride and 60 grs. pumice stone are conducted within 17 hours at 450–475° C. 216 grs. acetylene and 1700 grs. steam. The yield of acetone is 57,4%, while 24% of the acetylene remained unchanged.

Example 7

With a contact mass obtained from 150 grs. ceri ammonium nitrate and 150 grs. chromium nitrate with 60 grs. pumice stone operation at 405–408° C. resulted in a yield of acetone of 72,8%, while 19% of the acetylene remained unchanged.

Example 8

With a contact mass obtained from 150 grs. zirconium nitrate, 100 grs. barium nitrate and 65 grs. pumice stone there were obtained at a temperature of 430–470° C. 80,6% acetone, no acetic acid and acetaldehyde being formed. 10% of the acetylene remained unchanged.

Example 9

Over a contact mass obtained by treating in the manner above described 560 grs. tin tetrachloride hydrate, 120 grs. zirconium nitrate, 120 grs. cerium chloride and 150 grs. pumice stone were conducted at 495° C. during 21½ hours 283,5 grs. acetylene and 2500 grs. steam. The waste gases (359 ltrs.) contained 33% $CO_2$, 6% acetylene, 2,6% $CH_4$ and 58,4% $H_2$. 270 grs. acetone=85,3% of the calculated quantity and 3,5 grs. acetic acid were recovered. No acetaldehyde was formed. 9% of the acetylene remained unchanged.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:

1. The process of producing acetone comprising conducting a mixture of acetylene and steam at a temperature between 300 and 550° C. in contact with a mixed catalyst containing an oxide of tin and an oxide of a metal of the group consisting of cerium, zirconium, thorium, chromium, zinc and the alkaline earth metals.

2. The process of producing acetone comprising conducting a mixture of acetylene and steam at a temperature between 300 and 550° C. in contact with a mixture of stannic oxide and cerium oxide.

3. The process of producing acetone comprising conducting a mixture of acetylene and steam at a temperature between 300 and 550° C. in contact with a mixture of stannic oxide, cerium oxide and zirconium oxide.

In testimony whereof we affix our signatures.

HANS MEERWEIN.
HEINRICH MORSCHEL.